United States Patent [19]

Kiebke

[11] Patent Number: 5,216,980
[45] Date of Patent: Jun. 8, 1993

[54] HYDRATING CAT LITTER AND LITTER ADDITIVE

[76] Inventor: Theodore M. Kiebke, Rt. 1 Box 276A, Detroit Lakes, Minn. 56501

[21] Appl. No.: 858,688

[22] Filed: Mar. 27, 1992

[51] Int. Cl.⁵ .............................................. A01K 1/015
[52] U.S. Cl. ..................................... 119/173; 119/171
[58] Field of Search ........................ 119/171, 172, 173

[56] References Cited

U.S. PATENT DOCUMENTS 4,206,718  6/1980  Brewer ................................ 119/171
5,100,600  3/1992  Keller et al. ....................... 119/173

FOREIGN PATENT DOCUMENTS 76122  4/1983  European Pat. Off. ............ 119/173
94043  5/1985  Japan ................................... 119/173

*Primary Examiner*—John G. Weiss
*Attorney, Agent, or Firm*—Douglas L. Tschida

[57] ABSTRACT

A hydrating additive and improved cat litter including same which solidifies upon contact with liquids to encapsulate pet waste matter. The litter comprises a mixture of granulated clay particles, finely ground wheat based particulates and a fragrance carrier. In a preferred mixture, quantities of semolina are included with a moisture released masking fragrance consisting substantially of an attractant oil which is impregnated into ground, corn cob.

12 Claims, 2 Drawing Sheets

HYDRATING CAT LITTER AND LITTER ADDITIVE

BACKGROUND OF THE INVENTION

The present invention relates to cat litters and, in particular, to an improved scoopable litter.

Pet owners and particularly urban cat owners have numerous concerns pertaining to the care and maintenance of pets. An ever present problem is collecting and disposing of animal wastes. A secondary problem is masking any odor, pending disposal.

For cat owners, the predominate mechanism for collecting and disposing of the wastes is a so called "cat litter". Typically, the cat litter is contained within an appropriate container that is placed about the residence of the pet owner and where the cat overtime becomes accustomed to urinating or defecating. The liquids of the feces and urine are absorbed by the cat litter, which is periodically cleaned or discarded.

Commonly used cat litters may comprise a sand or gravel mixture, sawdust, wood chips or a clay based particulate. Deodorants or masking scents can be added to the base particulate material to mask the odor, pending collection. Such deodorizers can be added directly to the particulate or impregnated into an absorbent carrier. Depending upon the aroma and, if the cat is being trained to use an odoriferous mixture, the cat may either accept or reject the litter. Rejection is indicated by undesired messes at other than preferred locations about the household.

Another form of litter of which applicant is aware is a so called "scoopable" litter which has been recently introduced to the pet owner market. Such litters typically are comprised of a clay based particulate and to which a deodorizer is added, along with a hydrophilic material. The hydrophilic material reacts with the water in the urine and fecal matter to coalesce and produce clumps of litter where the animal has urinated or defecated. These clumps can be scooped from the container and disposed of along with any solid feces. A difficulty encountered with such commercially available litters is that a relatively soft clump of waste matter is formed with the hydrophilic action.

With subsequent use of the container by the same or multiple cats, the cats can cause the clumps to break-up and remix with the litter, unless the pet owner regularly cleans the litter container. With any remixing of the fecal matter, the pet owner is faced with the same problems as with a non-scoopable litter. Should the cats have worms or other digestive tract parasites, the released parasites can also be easily spread amongst the cats and even possibly to other pets.

Another difficulty is that cats tend to exhibit a preference for certain litters. Once trained to use one litter, a cat may reject another, even if offering improvements.

Accordingly, applicant has sought to develop a litter mixture which produces relatively hard clumps that encapsulate the waste and do not break up with continuing use by one or more cats. Desirably, the additive is also biodegradable and presents no undesired health problems to the cat.

The litter may include an attractant to minimize rejection of the litter by the cat. Moreover, the active ingredients of the mixture can be commercially sold as an additive mixture for use with commercially available nonscoopable litters. A non-scoopable litter upon mixing with the additive can thus be converted to a scoopable litter. As significant, any modified litter will be of a type familiar to the pet and not readily rejected.

SUMMARY OF THE INVENTION

It is accordingly a primary object of the present invention to provide a cat litter mixture including a hydrophilic media which produces a stable, relatively hard clump upon exposure to urine and fecal matter and encapsulates same.

It is a further object of the invention to provide a cat litter including a biodegradable, hydrating media having a relatively high gluten concentration capable of encapsulating the feces and particularly the urine into a permanently hard clump.

It is a further object of the invention to provide a hydrating media comprising a granular, wheat based additive.

It is a further object of the invention to provide a hydrating media comprising purified middlings of hard wheat, such as drum wheat and commonly known as semolina.

It is a still further object of the invention to provide a mixture including sodium bicarbonate and ground corn cob which is impregnated with a moisture released masking deodorizer.

It is a still further object of the invention to provide an attractant fragrance having "cat nip" qualities.

Various of the foregoing and advantages are particularly achieved in a preferred cat litter mixture and litter additive provided by the present invention. In a presently preferred form, the additive composition comprises quantities of semolina, sodium bicarbonate and ground corn cob, impregnated with a moisture released, masking and attractant fragrance. The fragrance is mixed with an oil derived from materials to which cats demonstrate an attraction, such as "catnip" type fragrances. The additive composition is biodegradable and digestible and not harmful to the animal's health.

In another composition, the additive is combined with clay based particulates or other commercially available cat litters. In combination, a scoopable litter is thereby obtained.

Still other objects, advantages and distinctions of the invention will become more apparent from the following description with respect to the appended drawings. Variously considered modifications and improvements are described as appropriate. The invention should not be strictly construed from the disclosure, but should be interpreted in view of the following appended claims.

DESCRIPTION OF THE PREFERRED EMBODIMENT

Figure 1:
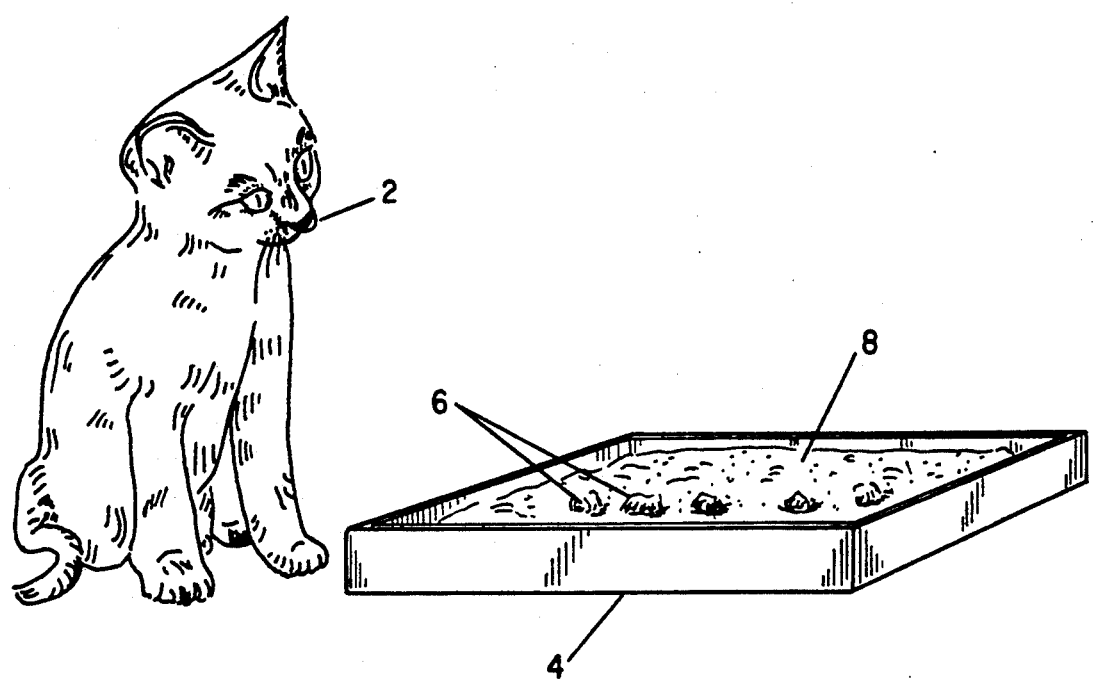
FIG. 1 is an isometric drawing showing a cat in relation to a typical container containing the inventive cat litter composition.

FIG. 1 depicts a cat 2 which is shown in relation to a typical container 4 for cat litter 8. Such containers can be of any construction or shape so long as they are liquid impermeable. The container 4 is normally sized in a range of 14 to 20 inches by 20 to 32 inches and provides a sidewall height sufficient to accommodate a nominal and minimal litter depth of two to four inches. The volume of the container is sized to contain a sufficient quantity of material to accommodate the normal cycle between cleanings.

Additional sidewall clearance is desired to permit the cat to partially cover the waste matter by pawing adjacent litter over the waste product, without creating undue spillage onto the surrounding floor. In the case of the present invention, the additional mechanical mixing by the pet also facilitates the formation of hardened, encapsulated clumps of waste matter 6. These clumps are readily removed with periodic cleaning and straining of the litter. The clumps 6 are typically removed to a plastic bag or the like and disposed of with the household garbage.

Figure 2:
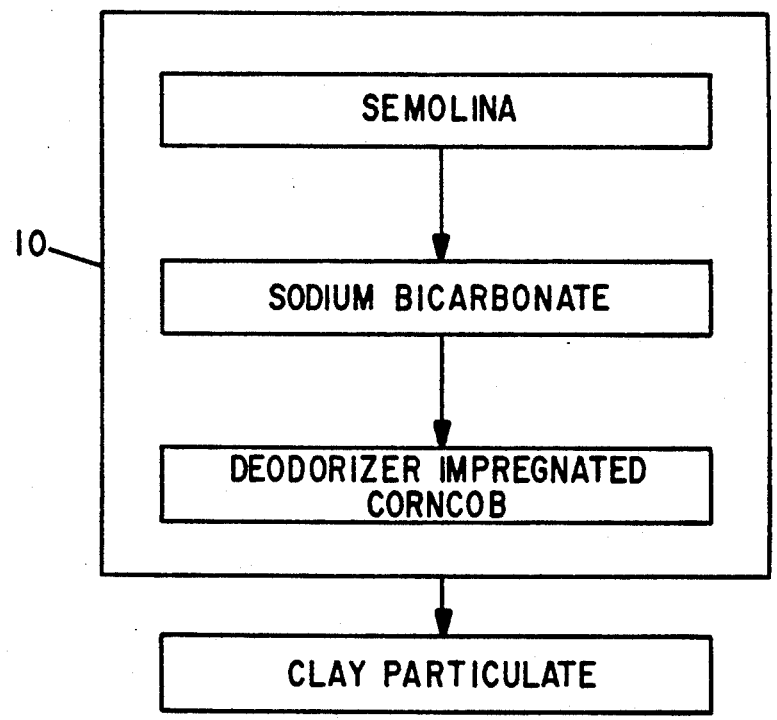
FIG. 2 shows a flow diagram for preparing the improved cat litter of the invention.

With further attention to FIG. 2, the base litter particulate 8 may comprise a variety of materials from sand to sawdust to wood shavings to clay particles. Mixed with the particulate 8 is an additive composition 10. The additive 10 consists of a quantity of gluten based media, along with sodium bicarbonate or baking soda and ground or shredded corn cob pieces.

Preferably, the gluten based media comprises a wheat derivative. Although flours of such grains provide desirable hydrophilic and adhesive or hydrating properties, they do not readily mix with the litter particulate; specifically, they tend to settle. Preferably, the gluten based media should remain in suspension. Grain flours can also contain bugs and become moldy over time, due to their biodegradable qualities.

In appreciation of the foregoing deficiencies, gluten based materials with a larger particulate size and granular consistency are desired. Particularly preferred media exhibit a consistency that permits ready mixing with the granular clay particulate and also provides an aesthetically pleasing coloration, such as purified middlings of hard wheat.

One particular granulation of durum wheat, commonly used to make pasta, is sold under the common name of semolina. Semolina is more grainy than various wheat flours and thus tends to remain in suspension with a clay particulate litter base. By maintaining a homogeneous suspension of the gluten based media closer to the exposed surface of a relatively liquid impermeable base particulate, a faster acting hydration or coalescence is achieved with the waste matter. This action also prevents the liquid from seeping through to the bottom of the container where clumping and/or hardening to the container bottom can create difficulties during periodic cleanings of the litter.

Appreciating the need to maintain the suspension of the granular, gluten based media, such as semolina, within the base particulate, tests have shown relative concentration ratios in the range of 1 to 6 parts of a clay particulate to the semolina provide the desired results. A 1:2 ratio provides a fast clumping action, although a 1:6 ratio reduces the cost per mixing.

A quantity of sodium bicarbonate or baking soda is also added to the mixture to activate the clumping action and to neutralize odors from the waste matter. A relative mixture range of this material to the purified semolina might comprise 1-5% bicarbonate to semolina. Settling of the bicarbonate is partially prevented by the fine grained semolina.

To further neutralize any waste matter odors and provide a masking scent, the present litter 8 includes a quantity of ground corn cob pieces. The corn cob particulate is impregnated with a biodegradable and digestible deodorizer or neutralizer. In particular, Applicant soaks the corn cob in a liquid material sold under the trade name NILOSORB which includes a desired fragrance oil. The NILOSORB is a water activated material which upon exposure to waste liquids releases the bound fragrance to mask the waste odors.

The NILOSORB has an inherent fragrance which acts like a "cat nip" or attractant and to which test animals have shown a definite preference. It is believed that the cause of this attraction is an amyl acetate oil base of the NILOSORB. Still other oils derived from mint plants can be added to the basic deodorizer or neutralizer. Otherwise, the impregnated corn cob is mixed with the semolina in a concentration range of 1-5% corn cob to semolina.

Taken alone, the composition mixture 10 of semolina, sodium bicarbonate and impregnated corn cob can be used as an additive with a clay particulate litter base. Alternatively, the composition can be added to other non-scoopable, commercially available cat litters to provide the desired clumping function. For those instances where a pet has become accustomed to one particular cat litter, such flexibility enables the pet owner to obtain the desired clumping, with a litter familiar to the cat and which is not likely to be rejected. Moreover, the attractant qualities of the NILOSORB deodorizer/neutralizer reduce the likelihood of rejection. In test cases, cats have shown a defined preference to litters improved with the invention.

Relative to the clumping action, the active ingredient predominantly comprises the semolina. Within the liquid impermeable environment of a clay particulate base, this material demonstrates a faster acting hydrophilic action to the liquid waste matter, than the corn cob. The corn cob, however, provides some absorption which holds the liquids and prevents the settling of the waste matter into the litter container. The use of ingredients, such as clay particles, semolina and ground corn cob, which exhibit comparable relative grain sizes also facilitates the desired homogeneous suspension profile.

Otherwise, upon exposure to liquids, the litter 8 or litters improved with the additive mixture composition 10 produce rock-hard clumps 6. After approximately thirty minutes of exposure to liquid wastes, clumps are formed which can be broken only with great difficulty and not with subsequent use of the litter container by the pet. Moreover, the clumps encapsulate the waste matter, such that any parasites contained within the fecal matter are less likely to be integrated into the litter container and distributed to other pets which may be using the same container. Depending too upon the concentration ratio of semolina to the base particulate, and for the above mentioned concentration ratios, most typically the clumping occurs within the first ½ to 1 inch layer of litter material.

The invention has been described with respect to the basic concept of using a digestible and biodegradable gluten based additive composition 10, such as containing wheat middlings with various other specific constituents. Various modifications and improvements thereto have also been suggested. It is to be appreciated, however, that still other equivalent compositions and mixtures may suggest themselves to those skilled in the art. Accordingly, it is contemplated the invention should be interpreted to include all those equivalent compositions within the spirit and scope of the following claims.

What is claimed is:

1. A non-hydrated cat litter composition comprising:
   a) a liquid impermeable, granular particulate; and b) a granular, gluten containing, hydrophilic media, wherein the granularity of the media is selected to upon mixing with the granular particular provide a substantially homogeneous suspension of the media relative to the granular particulate, and wherein said composition reacts in the presence of liquid containing animal waste to bind the animal waste into permanently hard clumps of animal waste, granular particulate and media.

2. A composition as set forth in claim 1 wherein said gluten containing media comprises middlings of hard wheat.

3. A composition as set forth in claim 2 wherein said hard wheat comprises durum wheat.

4. A composition as set forth in claim 1 including a liquid absorbent particulate.

5. A composition as set forth in claim 4 wherein the liquid absorbent particulate comprises ground corn cob.

6. A composition as set forth in claim 5 wherein the absorbent particulate is impregnated with a moisture released deodorizer.

7. A composition as set forth in claim 6 wherein said deodorizer includes amyl acetate.

8. A composition as set forth in claim 7 wherein said deodorizer includes oils of mint.

9. A cat litter additive comprising a non-hydrated composition consisting essentially of:
 a) a granular, gluten containing wheat based media, wherein the granularity of the media is selected to maintain a substantially homogeneous suspension of the media relative to a granular cat litter upon mixing;
 b) sodium bicarbonate; and
 c) a liquid absorbent particulate impregnated with amyl acetate oil.

10. A cat litter composition comprising:
 a) a granular clay particulate;
 b) durum wheat middlings, wherein the granularity of the wheat middlings is selected to maintain a substantially homogeneous suspension of the middlings relative to the clay particulate upon mixing;
 c) sodium bicarbonate; and
 d) corn cob particulate impregnated with a moisture released deodorizer consisting substantially of amyl acetate oil.

11. A cat litter additive composition comprising:
 a) durum wheat middlings, wherein the granularity of the wheat middlings is selected to maintain a substantially homogeneous suspension of the middlings relative to an existing litter upon mixing;
 b) sodium bicarbonate; and
 c) a corn cob particulate impregnated with a moisture released deodorizer consisting substantially of amyl acetate oil.

12. A cat litter comprising a non-hydrated composition consisting essentially of:
 a) a liquid impermeable, granular particulate;
 b) a granular, gluten containing wheat based media, wherein the angularity of the wheat based media is selected to upon mixing the provide a substantially homogeneous suspension of the media relative to the liquid impermeable granular particulate, and wherein said composition reacts in the presence of liquid containing animal waste to bind the animal waste into hardened clumps of animal waste, granular particulate and wheat based media; and
 c) a liquid absorbent particulate impregnated with a moisture released deodorizer.

* * * * *